United States Patent
Fischer et al.

(10) Patent No.: US 9,024,871 B2
(45) Date of Patent: May 5, 2015

(54) ELECTRICAL DEVICE, IN PARTICULAR A TELECOMMUNICATION DEVICE HAVING A PROJECTION UNIT AND METHOD FOR OPERATING AN ELECTRICAL DEVICE

(71) Applicants: Frank Fischer, Gomaringen (DE); Gael Pilard, Wankheim (DE)

(72) Inventors: Frank Fischer, Gomaringen (DE); Gael Pilard, Wankheim (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 14/059,172

(22) Filed: Oct. 21, 2013

(65) Prior Publication Data
US 2014/0111421 A1  Apr. 24, 2014

(30) Foreign Application Priority Data
Oct. 24, 2012  (DE) .......................... 10 2012 219 433

(51) Int. Cl.
*G06F 3/01* (2006.01)
*G02B 27/01* (2006.01)
*H04M 1/02* (2006.01)

(52) U.S. Cl.
CPC .............. *G06F 3/013* (2013.01); *H04M 1/0272* (2013.01); *G02B 27/017* (2013.01); *G02B 2027/0178* (2013.01); *G02B 2027/0187* (2013.01)

(58) Field of Classification Search
CPC ... G06F 3/013; G06F 3/0482; G06F 3/04817; G06F 3/017; H04N 7/181; H04N 1/3877
See application file for complete search history.

(56) References Cited

U.S. PATENT DOCUMENTS

2002/0099257 A1 * 7/2002 Parker et al. .................... 600/27

\* cited by examiner

*Primary Examiner* — Michael Faragalla
(74) *Attorney, Agent, or Firm* — Kenyon & Kenyon LLP

(57) ABSTRACT

A telecommunication device has: a projection unit for projecting image information on a projection surface situated outside the telecommunications device, the image information being projected onto the projection surface (i) with the aid of at least one optical element in a projection beam path for sequentially constructing an image, and (ii) for momentarily spatially limiting the projection relative to the total area of the image information on the projection surface; and a detection unit. During projection a movement of the projection surface, e.g., a displacement or a rotation, takes place relative to the projection unit. The detection unit detects the movement of the projection surface with the aid of a reflection signal passing along a detection beam path, the projection beam path and the detection beam path coinciding at least in the area of the at least one optical element.

8 Claims, 3 Drawing Sheets

ELECTRICAL DEVICE, IN PARTICULAR A TELECOMMUNICATION DEVICE HAVING A PROJECTION UNIT AND METHOD FOR OPERATING AN ELECTRICAL DEVICE

BACKGROUND OF THE INVENTION

1. Field of the Invention

The present invention is directed to an electrical device, e.g., a telecommunication device having a projection unit.

2. Description of the Related Art

Such electrical devices, in particular telecommunication devices, are generally known, particularly in the form of telecommunication terminals, such as for example portable computers or portable telephones or the like, which include a projection unit.

Such communication devices have the advantage that not only does the electrical device have a comparatively small display surface or display unit for representing image information, but image information is also projected directly into the eye of the user. Thus, it is advantageously possible to use such electrical devices, for example, in the form of glasses, which the user puts on and views screen content as a result of it being projected into the eye of the user.

Such electrical devices are also known as "virtual retinal displays." A user is able to view superimposed content with the aid of such data glasses. Typically, a laser scanner, which reproduces the image information to be displayed or projected onto the retina, is used for providing such electrical devices according to the present invention in the form of data glasses.

The drawback with conventional data glasses is that generating or detecting feedback by the user of the data glasses—for example, the feedback that a portion of the displayed image information should be clicked in order to enable a particular function or to carry out a particular activity—is severely hampered, because touch-free control is impossible or possible only at a disproportionately high expense.

BRIEF SUMMARY OF THE INVENTION

The electrical device according to the present invention and the method according to the present invention for operating an electrical device have the advantage over the related art that a user feedback with respect to the projected image information is easily possible to the extent that, for example, a particular portion of the image information represented may be selected by the eye of the user being projected into, by rotating and focusing an object that is virtually displayed, yet targeted by the user. This is the case because generally the human eye, by rotating and focusing, is naturally or automatically rotated in such a way that a targeted or fixed object is always imaged in the area of sharpest vision or in the area of sharp sightedness (yellow spot). This makes it possible according to the present invention to identify the object. According to the present invention it is provided to monitor the retina of the observer. Here, an image of the retina is ascertained at the same time the image is projected into the eye of the user. The structure of the blood vessels and the color regions on the retina are detected in this process by the micromirror module via the reverse beam path. In this way, the structure of the retina is monitored in the area instantaneously illuminated by the scanner. Since the eye, by rotating and focusing, always images a targeted object in the area of sharpest vision (yellow spot), it is possible to detect or identify the targeted object of the image information represented by calculating a displacement vector of the displacement or rotation of the retina as a result of a previously detected and stored retinal structure.

According to one preferred specific embodiment it is provided that the detection unit includes a radiation source for—relative to the total area of the projection surface—spatially expanded irradiation of the projection surface.

This makes it possible in a particularly advantageous way according to the present invention to employ infrared radiation sources and an infrared-sensitive receiver component, for example, in addition to the visible light used for projection. Thus, for the purpose of detecting the retinal image, it is not absolutely necessary according to the present invention to resort to visible light used for projection. According to the present invention, however, it is also possible according to an alternative specific embodiment to use the light used for projecting, in particular blue light or the blue spectral portion of the light used for projecting. In this last mentioned embodiment variant of the electrical device according to the present invention it is of course not necessary (as opposed in addition to the projection light source) to provide a radiation source for—relative to the total area of the projection surface—spatially expanded irradiation of the projection surface. According to the present invention, in one specific embodiment of the electrical device that includes such a supplemental radiation source for the detection unit, an infrared laser diode may be used as a radiation source for generating the reflection signal, in addition to the lasers that generate the visible light used for projecting. In this last mentioned case, the radiation source used to generate the reflection signal or the radiation generated by this radiation source is cast together with the projection light onto the projection surface and in turn reflected by the projection surface. If on the other hand a radiation source with spatially expanded irradiation of the projection surface (i.e., outside the projection beam path) is used, the radiation of the radiation source reflected by the projection surface, in particular infrared radiation, is detected over a portion of the projection beam path, making possible an angle-resolved or coordinate-resolved analysis of the reflection signal. Thus, based on the radiation of the reflection signal, in particular reflected infrared radiation, a reflected image of the projection surface or the retina may, given the spatial resolution of the reflection signal, be associated with the image coordinates of the projected image or the projected image information.

Moreover, according to the present invention, by detecting additional gestures, such as, for example, blinking or acoustic signals (by the user) it is also possible to communicate whether the targeted object within the projected image information in the display surface or on the projection surface of the electrical device is to be used for activating functions in the sense of a software control. For example, this may involve a button for controlling the volume of an application or the like, or a selection menu. According to the present invention, it is thus possible to control the image content without requiring further input assistance by merely fixing a control symbol within displayed image information that is projected on a projection surface in the form of a user's retina.

According to the present invention, it is particularly preferred that the detection unit includes a detection output, the radiation emitted by the radiation source being directed by the detection output onto the projection surface. It is hereby advantageously possible according to the present invention to enable a spatially resolved feedback on the reflection structure or the reflection pattern of the projection surface, despite full-surface illumination or irradiation of the projection surface via the additional radiation source.

According to the present invention, it is also preferably provided that the detection unit includes a beam splitter, the beam splitter being situated in the detection beam path, the projection beam path and the projection beam path between the at least one optical element and the beam splitter being identical, and the beam splitter being situated along the course of the projection beam path preferably at a point between a projection light source and the at least one optical element. This makes it advantageously possible according to the present invention to decouple the reflection signal in a simple manner, thereby making it possible to easily analyze the reflected retinal image.

It is also preferable according to the present invention for the detection unit to also include a beam detector, the beam detector being sensitive with respect to radiation emitted from the radiation source or with respect to at least one portion of the light emitted from the projection light source. This makes it advantageously possible according to the present invention to obtain spatially resolved information on the reflection structure of the projection surface, in particular the retina of a user, so that it may be determined based on the timing of the reflection signal which portion of the image information in particular the user is focusing on at this moment.

According to the present invention it is further preferable if the electrical device is a telecommunications device, in particular a portable telecommunication terminal, in particular in the form of a portable computer or a portable mobile telephone. According to the present invention, this makes it advantageously possible to use the projection unit of such an electrical device, given a particularly mobile application of the electrical device, in particular without the possibility of using a pointing device, such as, for example, a computer mouse or the like.

In the method according to the present invention it is preferable if the movement of the projection surface in the form of a displacement or in the form of a rotation of the projection surface relative to the projection unit is detected by comparing the reflection signal associated with a—relative to the total area of the projection surface—spatially expanded area of the projection surface, preferably the entire area of the image information on the projection surface, with a stored reference reflection signal.

According to the present invention, this allows the displacement or the movement of the projection surface to be detected in a particularly advantageous manner and, correspondingly, allows the section of the image of the projected image information focused on by a user to be detected.

DETAILED DESCRIPTION OF THE INVENTION

Figure 1:
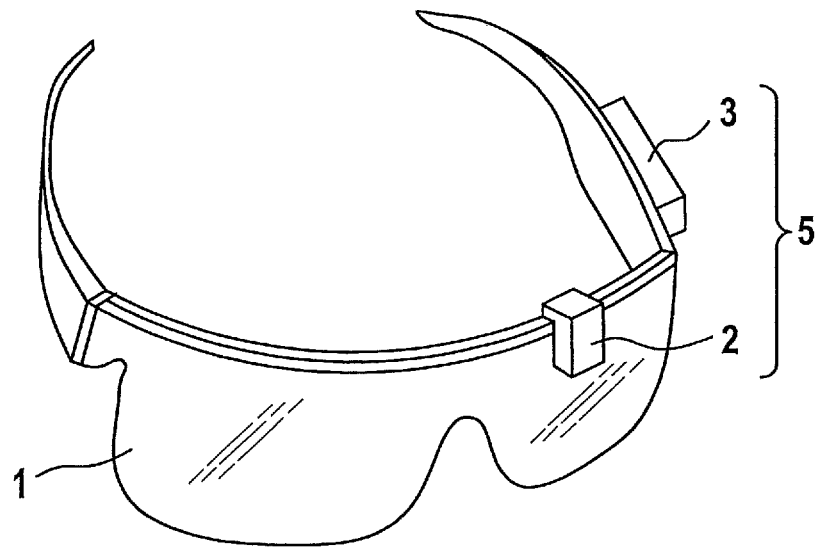
FIG. 1 schematically shows a perspective view of an electrical device according to the present invention including a projection unit.

Identical parts are marked with identical reference numerals in the various drawings and hence each are generally cited or mentioned only once.

FIG. 1 schematically shows a perspective view of a telecommunications device 5 which represents an example of an electrical device 5, electrical device 5 in FIG. 1 in the form of data glasses 1 being fitted with an integrated laser scanner projector 2. In this example, a laser module and a mirror deflection unit are integrated into a projection head 2. The control electronics may also be integrated into projection head 2 or, however, they may be situated in a separate module 3 outside the field of vision. Together, projection head 2 and separate module 3 form electrical device 5 according to the present invention.

Figure 2:
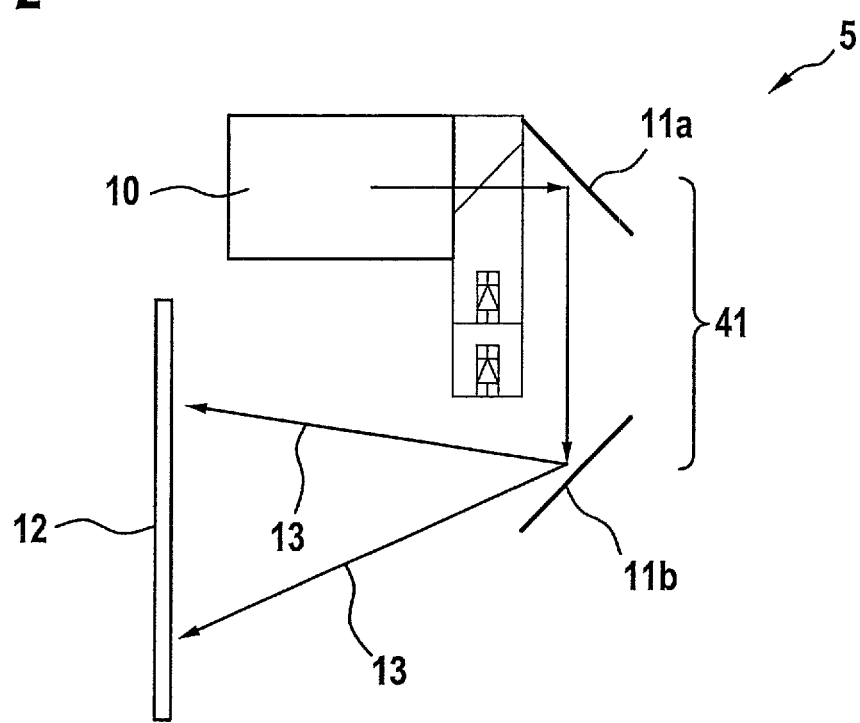
FIGS. 2 and 3 each schematically show a side view of a projection beam path or a detection beam path of an electrical device according to the present invention.
Figure 3:
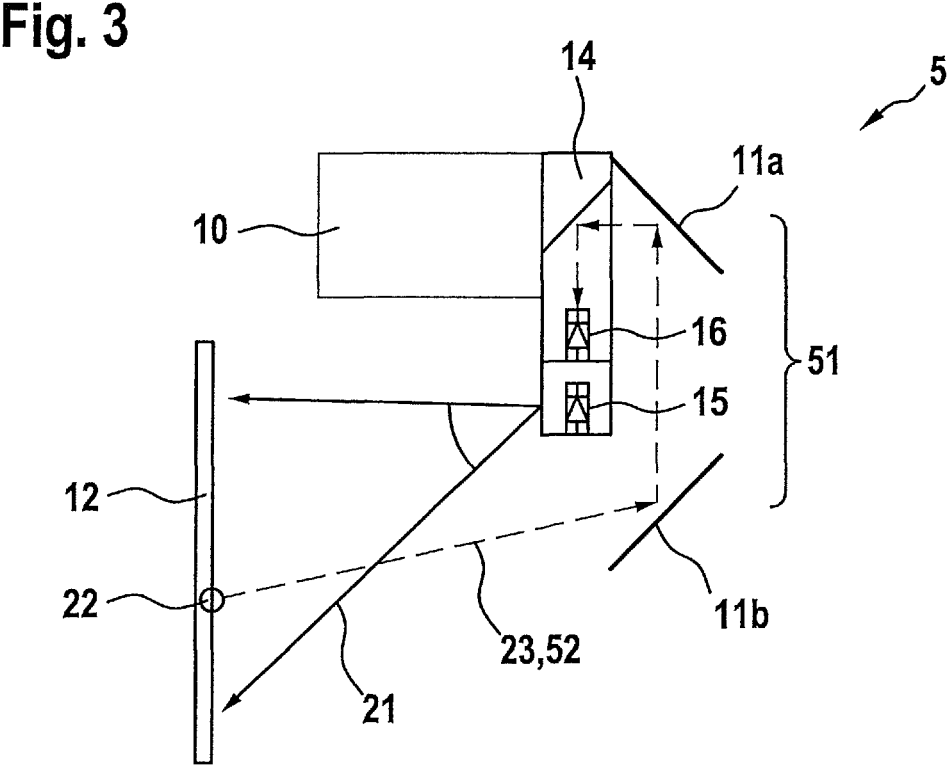

FIGS. 2 and 3 each show in a schematic side view a projection beam path (FIG. 2) and a detection beam path (FIG. 3) of an electrical device 5 according to the present invention. A laser module 10, hereinafter referred to as projection light source 10, typically includes multiple laser units which project focused light in the visible wavelength range onto multiple micromirrors 11a, 11b, micromirrors 11a, 11b enabling the projection light or the projection light beam to be deflected onto projection surface 12, projection surface 12 typically corresponding to the human retina, and a human eyeball is to be imagined in the area of the marginal rays or marginal angle of the projection represented by reference numeral 13. With the aid of micromirror system 11a, 11b it is possible to project a line-by-line representation or line-by-line projection of image information to be projected onto projection surface 12, i.e., onto the retina of the user by mechanically deflecting micromirrors 11a, 11b. Micromirrors 11a, 11b are also referred to hereinafter as optical elements 11a, 11b or, in the case of a single mirror, as one optical element. The course of propagation of the projection light represented in FIG. 2 by arrows originating from projection light source 10 corresponds to projection beam path 41 according to the present invention.

FIG. 3 schematically shows an exemplary embodiment of a detection beam path 51 of electrical device 5 according to the present invention. Also apparent are projection light source 10, micromirror system 11a, 11b and projection surface 12. Radiation, typically infrared light, for example, in the wavelength range of approximately 800 nm to 950 nm is emitted from a light diode 15, referred to hereinafter as radiation source 15, and likewise cast or projected onto projection surface 12. If the light or radiation of radiation source 15, preferably infrared light, strikes a diffusing or reflecting object 22, for example, a blood vessel structure in the retina of a user (which is situated, for example, against the backdrop of projection surface 12, i.e., the retina), a portion 23 of the radiation projected onto projection surface 12, in particular infrared radiation, is reflected back and is guided via mirrors 11a, 11b of the mirror system. The radiation originating from radiation source 15 is denoted in FIG. 3 by reference numeral 21, whereas the reflected radiation is denoted by reference numeral 23. Reflected beam 23 of radiation originating from radiation source 15 is also referred to hereinafter as reflection signal 52. Reflection signal 52 is supplied via micromirror system 11a, 11b or via at least one optical element 11a, 11b to a beam splitter 14, which separates the beam (typically infrared beam) from the projected light. In this case, beam splitter 14 may, for example, be permeable to visible light, but reflective for the infrared radiation to be detected or reflective in general for the radiation originating from radiation source 15. In this way, reflected light 23, i.e., reflection signal 52, is directed to a receiver component 16, referred to hereinafter also as radiation detector 16. Radiation detector 16 is used to evaluate the light reflected from projection surface 12. Since the position of the site viewed on projection surface 12 is a function of the angular position of mirrors 11a, 11b, it is possible during projection to scan the entire surface area of projection surface 12 via reflection signal 52. In the case of laser projection data glasses, the projection surface is directly on the retina of the user. In this way, the infrared reflectivity of the retina is communicated using the device described.

Figure 4:
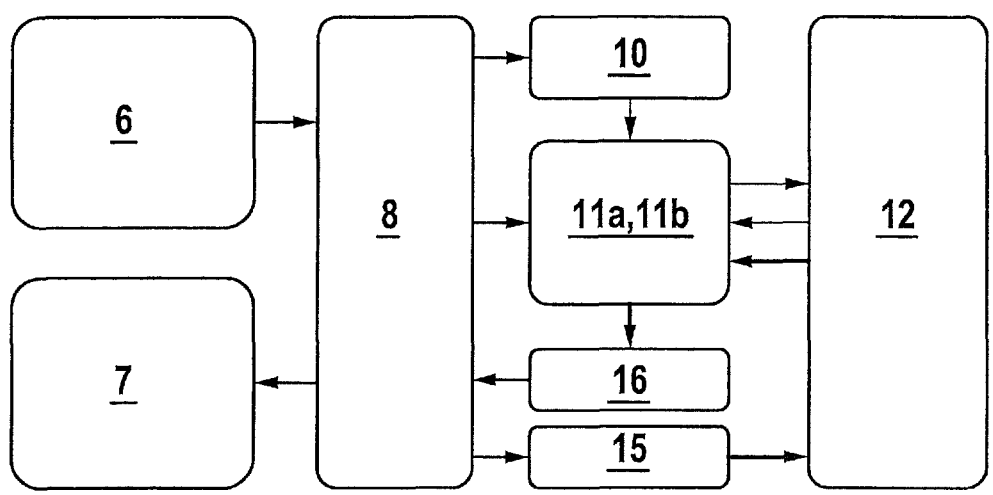
FIG. 4 shows a schematic block diagram of the electrical device according to the present invention.

FIG. 4 schematically shows a block diagram of electrical device 5 according to the present invention. An image source 6 supplies a video control device 8 or a video controller with an image signal to be projected, video controller 8 or the video control of projection light source 10 supplying a signal for generating an activation signal corresponding to the video information or image information. Projection light source 10 relays this signal to the at least one optical element 11a, 11b, which transmits the projection light via projection beam path 41 to projection surface 12. In the exemplary embodiment depicted in FIG. 3, radiation source 15, also controlled by video control unit 8, also projects radiation, in particular infrared radiation, onto projection surface 12. Projection surface 12 reflects back at least a portion of this radiation received from radiation source 15 which is, in turn, captured by the mirror system or by optical element 11a, 11b and transmitted to radiation detector 16 (in particular with the aid of a beam splitter 14 not separately shown in FIG. 4). A memory area 7 present in electrical device 5 includes a stored reference reflection signal, typically of the retina of the user, in such a way that reflection signal 52 is used to determine in which direction the retina of the user has rotated and therefore on which area or portion of image information the focus lies. The previously made choice may then be activated, for example, by blinking or by some other input motion or input command of a user of the device according to the present invention. Radiation source 10, in particular an infrared light diode, may according to the present invention be operated in pulse mode or in continuous mode. Reflected light 52 or reflection signal 52 may according to the present invention in particular be filtered so that only the infrared portion strikes the light-sensitive component, i.e., radiation detector 16. Thus, the signal of the reflection signal received at radiation detector 16 may be associated in a simple manner with the mirror position of the at least one optical element 11a, 11b and stored in a memory (infrared image).

Figure 5:
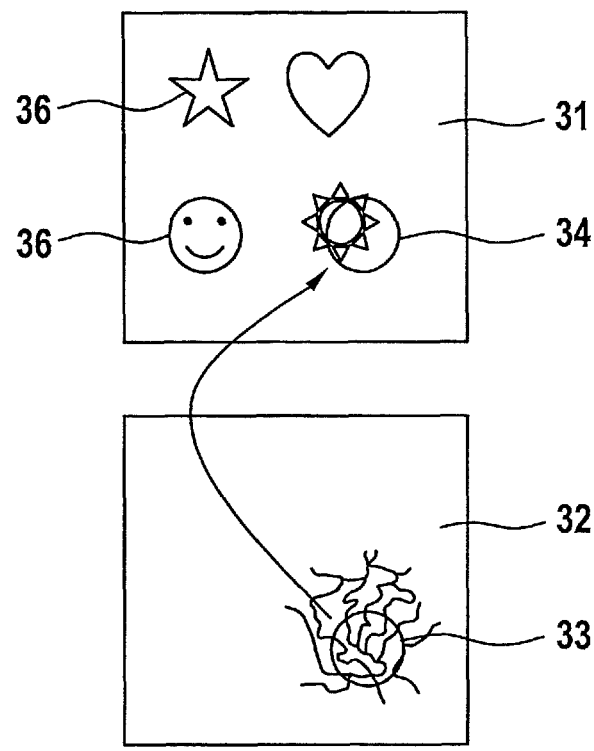
FIG. 5 shows a schematic example for explaining the functionality of the electrical device.

FIG. 5 schematically shows the contents of image information 31. Control symbols 36 are indicated which are inserted by the application software and are imaged on the retina of the user. Shown in the lower portion of FIG. 5 is the content of memory 7 or memory 32, which represents an infrared image of the retina from the reflected light path, i.e., the reflection path. Seen here are basically color structures which occur as a result of the blood vessel structure of the retina or of the underlying choroid and pigmentation caused by the cones and rods, shown only in part in the image. The structures are specific to each user, and like a map, provide clear insight into the discolorations and structure of blood vessels in spatial areas of the retina. In the method according to the present invention, it is essential to be able to discern the structure of the blood vessels and/or hue of the retina and to ascertain therefrom the position of the yellow spot. In FIG. 5 the blood vessel structure of the retina was detected and the position of the yellow spot in area 33 in the infrared reflection, i.e., the reflection signal, depicted in the lower area of the image was ascertained therefrom. The diameter of the yellow spot (also referred to as macula) is, for example, on the order of two millimeters in size. Since the eye when focusing adjusts to this area, it may be inferred that the observer fixes the image projected in visible light, for example, the sun in area 34.

According to the present invention, detecting the blood vessel structure of the retina requires the individual image of the retina to be taught-in in a kind of calibration routine and from that the position of the yellow spot of the user to be ascertained, which may be accomplished by the same principle (fixing a predefined image area, determining the retinal structure, ascertaining the yellow spot in the reflection signal at the point at which the fixed symbol is situated in the projection image). To define the selection of the focused symbol, blinking or other additional gestures, for example, may be used. Blinking may be optically detected, for example, via reflection of the reflection signal from the retina (modulated by closing the eyelid) or also by measuring muscle movement, for example, by measuring the impedance of the skin surface or the like, acoustically or by touch, for example.

Figure 6:
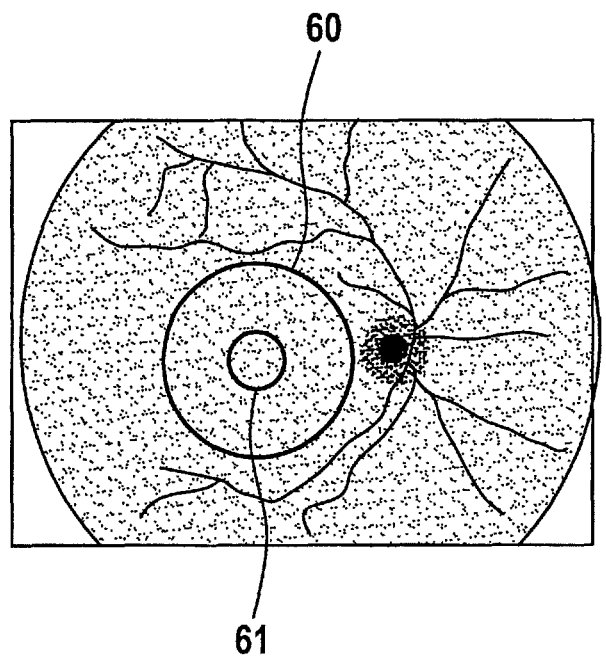
FIG. 6 shows a schematic example of a representation of the retina.

FIG. 6 is merely exemplary of a portion of a retina with macula 60 (yellow spot), which corresponds to the point of sharpest vision. The innermost region of the macula is also referred to as fovea 61 (diameter approximately 1 mm).

What is claimed is:

1. An electrical device, comprising:
 a projection unit projecting image information along a projection beam path onto a projection surface located outside the electrical device, wherein the image information is projected onto the projection surface (i) with the aid of at least one optical element in the projection beam path for sequentially constructing an image, and (ii) for momentarily spatially limiting the projection relative to the total area of the image information on the projection surface; and
 a detection unit, wherein during projection a movement of the projection surface taking place in the form of one of a displacement or a rotation of the projection surface relative to the projection unit, the detection unit being configured to detect the movement of the projection surface with the aid of a reflection signal based on a reflection on the projection surface, the reflection signal passing along a detection beam path, and wherein the detection beam path and the projection beam path coincide at least in the area of the at least one optical element.

2. The electrical device as recited in claim 1, wherein the detection unit includes a radiation source for providing a spatially expanded irradiation of the projection surface relative to the total surface area of the projection surface.

3. The electrical device as recited in claim 2, wherein the detection unit includes a detection output, and wherein the radiation emitted from the radiation source is directed by the detection output onto the projection surface.

4. The electrical device as recited in claim 2, wherein:
 the detection unit includes a beam splitter situated in the detection beam path;
 the projection beam path and the detection beam path between the at least one optical element and the beam splitter are identical; and
 the beam splitter is situated along the course of the projection beam path at a point between a projection light source and the at least one optical element.

5. The electrical device as recited in claim 4, wherein the detection unit also includes a radiation detector sensitive to one of (i) radiation emitted from the radiation source or (ii) at least a portion of the light emitted from the projection light source.

6. The electrical device as recited in claim 5, wherein the electrical device is a portable telecommunication device.

7. A method for operating an electrical device having a projection unit and a detection unit, comprising:

projecting, by a projection unit, image information along a projection beam path onto a projection surface located outside the electrical device, wherein the image information is projected onto the projection surface (i) with the aid of at least one optical element in the projection beam path for sequentially constructing an image, and (ii) for momentarily spatially limiting the projection relative to the total area of the image information on the projection surface; and detecting, by a detection unit, a movement of the projection surface taking place during projection in the form of one of a displacement or a rotation of the projection surface relative to the projection unit, wherein the detection unit detects the movement of the projection surface with the aid of a reflection signal based on a reflection on the projection surface, the reflection signal passing along a detection beam path, and wherein the detection beam path and the projection beam path coincide at least in the area of the at least one optical element.

8. The method as recited in claim 7, wherein the detection of the movement of the projection surface in the form of one of a displacement or a rotation of the projection surface relative to the projection unit takes place by comparing the reflection signal associated with a spatially expanded area of the projection surface relative to the total surface area of the projection surface with a stored reference reflection signal.

\* \* \* \* \*